US011454559B2

United States Patent

(12) United States Patent
Hall et al.

(10) Patent No.: US 11,454,559 B2
(45) Date of Patent: Sep. 27, 2022

(54) SYSTEM AND METHOD OF TESTING THE TENSION OF ANCHORS IN A DAM

(71) Applicant: Engineering Innovations, LLC, Vicksburg, MS (US)

(72) Inventors: Robert L. Hall, Vicksburg, MS (US); Ziyad Duron, Claremont, CA (US)

(73) Assignee: Engineering Innovations, LLC, Vicksburg, MS (US)

( * ) Notice: Subject to any disclaimer, the term of this patent is extended or adjusted under 35 U.S.C. 154(b) by 478 days.

(21) Appl. No.: 16/689,256

(22) Filed: Nov. 20, 2019

(65) Prior Publication Data

US 2021/0148773 A1 May 20, 2021

(51) Int. Cl.
*G01L 5/00* (2006.01)
*G01L 5/06* (2006.01)

(52) U.S. Cl.
CPC .................................... *G01L 5/06* (2013.01)

(58) Field of Classification Search
CPC ........................................................ G01L 5/06
See application file for complete search history.

(56) References Cited

U.S. PATENT DOCUMENTS 3,975,915 A * 8/1976 Haw ...................... E02B 7/005 405/110
4,128,011 A 12/1978 Savage
4,621,943 A * 11/1986 Swanson ................ E01C 11/20 52/223.13
4,934,441 A * 6/1990 Wood .................. B22D 11/066 164/452
5,750,894 A 5/1998 Russell et al.
(Continued)

FOREIGN PATENT DOCUMENTS

CA 2155077 2/1997
CN 110197015 A * 9/2019
(Continued)

OTHER PUBLICATIONS

McInerney, Michael; Acoustic nondestructive testing of steel reinforcing members in concrete; retrieved from: https://www.researchgate.net/publication/254543962_Acoustic_nondestructive_testing_of_steel_reinforcing_members_in_concrete.
(Continued)

*Primary Examiner* — Max H Noori
(74) *Attorney, Agent, or Firm* — Angela Holt; Bradley Arant Boult Cummings LLP

(57) ABSTRACT

Systems and methods of determining a tension of an anchor embedded in a dam are described. A dynamic impulse response of the dam is empirically obtained in such that a portion of the empirical dynamic impulse response is dominated by a dynamic behavior of the anchor. Furthermore, a set of modeled impulse responses that map to a set of tension values for the anchor are obtained. Next, a closest matching modeled impulse response from the set of modeled impulse responses that is a closest match to the portion of the empirical dynamic impulse response that is dominated by the dynamic behavior of the anchor is determined. Finally, a tension value from the set of tension values is selected, which is the closest match to the portion of the dynamic impulse response dominated by the dynamic behavior of the anchor. As such, the tension value of the anchor can be determined.

19 Claims, 14 Drawing Sheets

(56) References Cited

U.S. PATENT DOCUMENTS

| | | | |
|---|---|---|---|
| 6,105,430 A | 8/2000 | Kepler et al. | |
| 6,422,079 B1 | 7/2002 | Rodger et al. | |
| 7,823,466 B2 * | 11/2010 | Glass | G01L 5/103 73/826 |
| 7,895,015 B2 | 2/2011 | Parker et al. | |
| 7,958,788 B2 | 6/2011 | Ford | |
| 8,176,800 B2 | 5/2012 | Cesare et al. | |
| 8,671,758 B2 | 3/2014 | Jacobsen et al. | |
| 9,464,949 B2 | 10/2016 | Mahlen et al. | |
| 2004/0123665 A1 | 7/2004 | Blodgett et al. | |
| 2015/0191888 A1 * | 7/2015 | Karsten | E02D 29/0233 405/262 |
| 2015/0338380 A1 | 11/2015 | Ziehl et al. | |

FOREIGN PATENT DOCUMENTS

| | | | |
|---|---|---|---|
| EP | 2295948 B1 | 3/2011 | |
| WO | WO-2015062958 A1 * | 5/2015 | B66B 7/1215 |
| WO | 2017124188 A1 | 7/2017 | |

OTHER PUBLICATIONS

Cercone, Christina; Designing and Detailing Post Tensioned Bridges to Accomodate Non-Destructive Evauluation; ATLSS Report 14-01; retrieved from: http://www.atlss.lehigh.edu/documents/Reports/ATLSS_Report_14_01.pdf.

* cited by examiner

| 1500 kips | 1600 kips | 1625 kips | 1650 kips |
|---|---|---|---|
| 86 | 89 | 90 | 90 |
| 104 | 107 | 108 | 108 |
| 121 | 125 | 126 | 127 |
| 139 | 143 | 144 | 145 |
| 157 | 162 | 163 | 164 |
| 175 | 180 | 182 | 183 |
| 193 | 199 | 200 | 202 |
| 211 | 218 | 220 | 221 |
| 230 | 237 | 239 | 241 |
| 249 | 257 | 258 | 260 |
| 268 | 276 | 278 | 280 |
| 288 | 296 | 298 | 300 |
| 307 | 316 | 319 | 321 |
| 328 | 337 | 339 | 342 |
| 348 | 358 | 360 | 363 |
| 369 | 379 | 382 | 384 |
| 390 | 401 | 403 | 406 |
| 411 | 423 | 425 | 428 |
| 433 | 445 | 448 | 451 |
| 456 | 468 | 471 | 474 |
| 478 | 491 | 494 | 497 |
| 502 | 514 | 518 | 521 |
| 525 | 538 | 542 | 545 |
| 549 | 563 | 566 | 570 |
| 574 | 588 | 591 | 595 |
| 599 | 613 | 616 | 620 |
| 624 | 639 | 642 | 646 |
| 650 | 665 | 669 | 672 |
| 676 | 692 | 696 | 699 |
| 703 | 719 | 723 | 727 |

FIG. 10

SYSTEM AND METHOD OF TESTING THE TENSION OF ANCHORS IN A DAM

FIELD OF THE DISCLOSURE

This disclosure relates generally to technology related to the testing of dams.

BACKGROUND

Concrete dams are now provided with post-tension strands that tie the concrete monoliths of the dam to an anchor point, usually in the rock foundation. The advantage of a retensionable anchor is the ability to periodically measure the anchor's tension and, if necessary, retension the anchor. However, these types of strands suffer from potential corrosion and a loss of load due to relaxation, which is be addressed by pre-stressing the anchors to greater forces than required. This approach allows for some relaxation of the anchor tension, while still meeting design requirements. Unfortunately, apart from lift-off testing techniques, there are currently no practical options for non-destructive assessing or evaluating the condition of multiple-strand anchors, especially those which are not retensionable and are embedded into the concrete monolith. Thus, what is needed are new techniques for determining the tension value of an anchor so that the anchor can be repaired, replaced, or retensioned without causing damage to the dam itself.

SUMMARY

This disclosure relates generally to technology related to the testing of dams. In one embodiment, a method of determining a tension of an anchor embedded in a dam is described. To do this, an empirical dynamic impulse response of the dam is empirically obtained such that a portion of the dynamic impulse response is dominated by a dynamic behavior of the anchor. Furthermore, a set of modeled impulse responses for the anchor are obtained, wherein the set of modeled impulse responses map to a set of tension values for the anchor. Next, a closest matching modeled impulse response from the set of modeled impulse responses that is a closest match to the portion of the empirically dynamic impulse response that is dominated by the dynamic behavior of the anchor is determined. Finally, a tension value from the set of tension values for the anchor is selected, wherein the selected tension value maps to the closest matching modeled impulse responses. In this manner, the tension value of the anchor can be determined without causing damage to the dam.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawings incorporated in and forming a part of this specification illustrate several aspects of the disclosure, and together with the description serve to explain the principles of the disclosure.

FIG. 10 illustrates a table with sets of resonant frequencies associated with tension values for an anchor.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Figure 1:
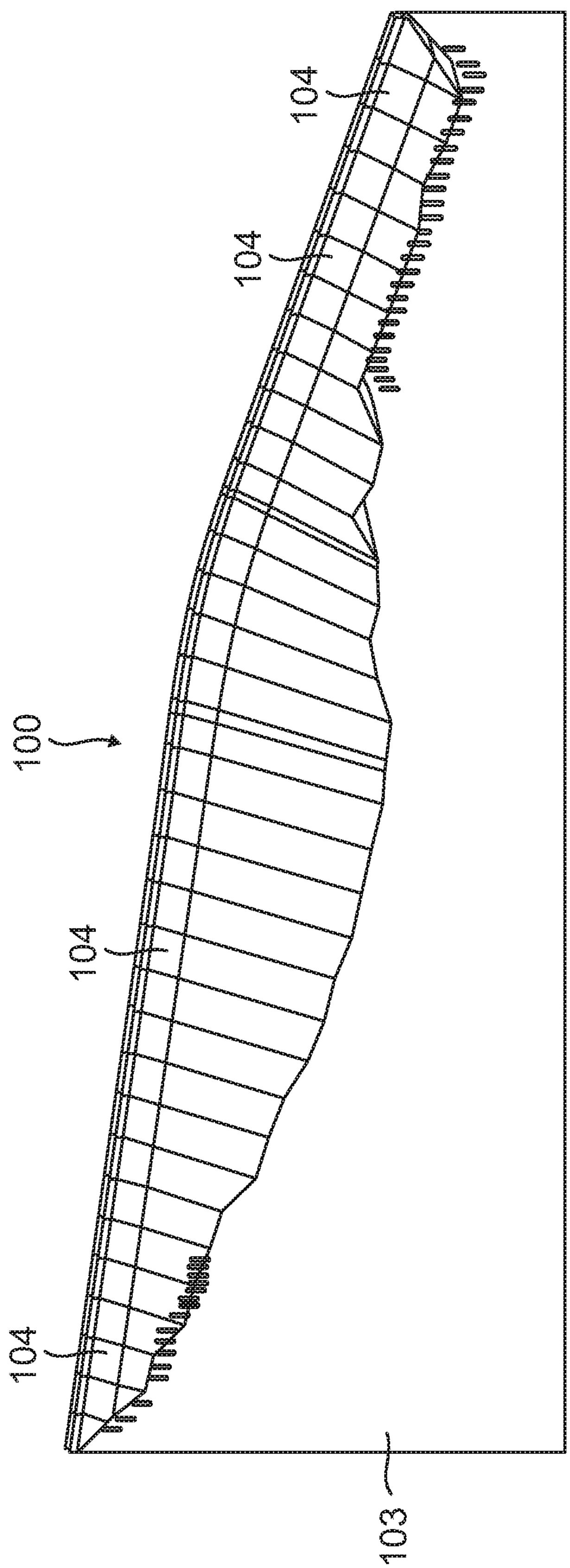
FIG. 1 illustrates one embodiment of a dam.
Figure 2:
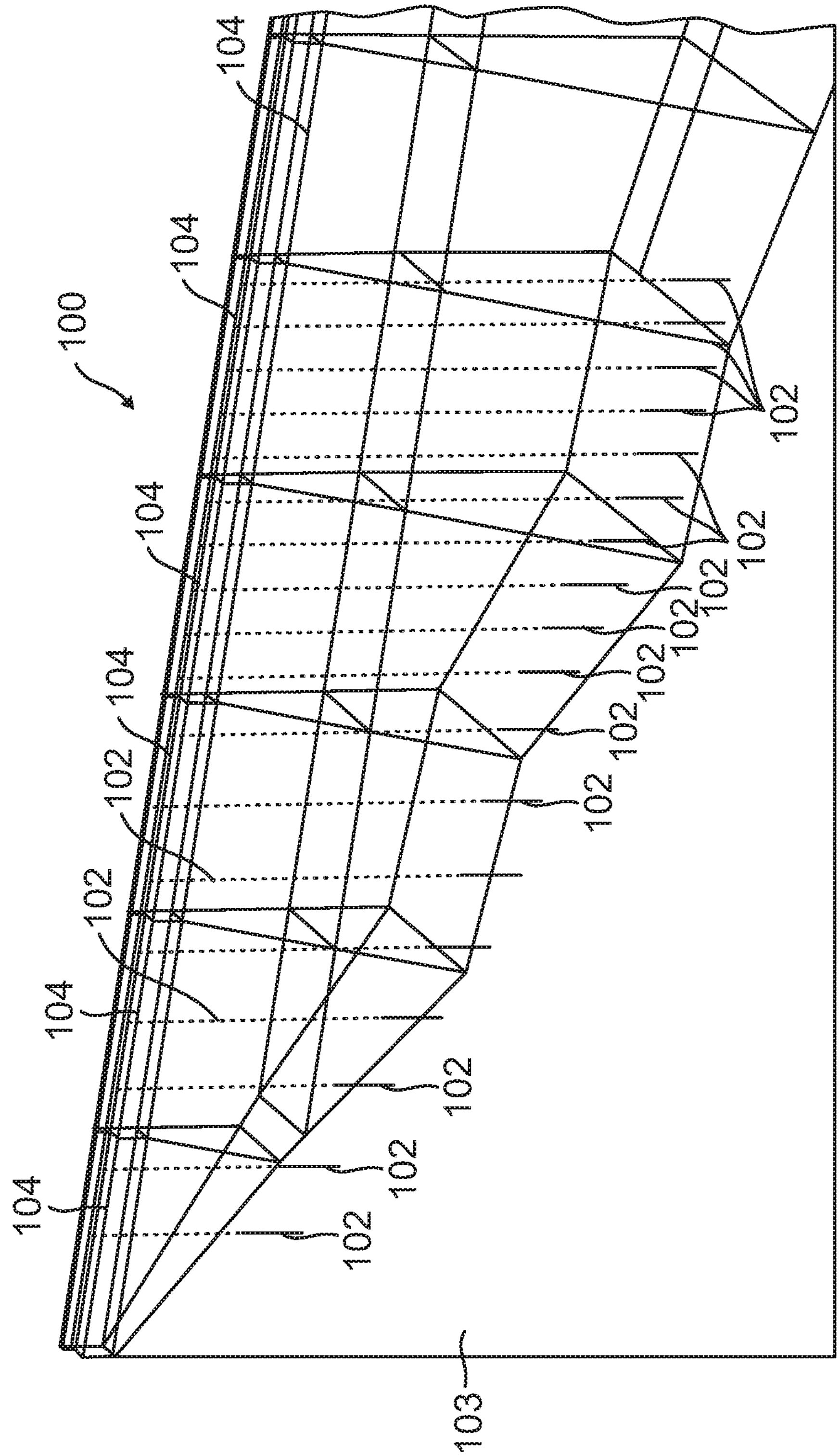
FIG. 2 illustrates a close up view of anchors on the right side of the dam shown in FIG. 1.

Referring now to FIG. 1 and FIG. 2, FIG. 1 illustrates one embodiment of a dam 100 while FIG. 2 illustrates a close up view of anchors 102 on the right side of the dam 100 shown in FIG. 1. The anchors 102 may be tested in accordance with the methods described herein. In this embodiment, the dam 100 is a gravity dam that is secured to foundational rock 103. In this example, the dam 100 is made from concrete but other embodiments of the gravity dam may be formed from stone masonry. In fact, embodiments of the testing techniques may in any other type of dam such as an arch dam, an arch gravity dam, a gravity dam, embankment dams, rock fill dams, concrete-face rock fill dams, earth-fill dams, saddle dams, a weir, a check dam, a dry dam, a diversionary dam, an underground dam. A tailing dam, a steel dam, a timber dam, a spillway, and/or the like. With regard to the dam 100 shown in FIG. 1, the dam 100 is formed from concrete monoliths 104 (not all labeled for the sake of clarity) and the anchors 102, which are embedded in the monoliths 104 of the dam 100 and extend into the foundational rock 103.

In this embodiment, the monoliths 104 are formed from concrete. However, the monoliths 104 may be formed from any suitable material. The anchors are members (such as bars or strands) that transmit a tensile force from the monoliths 104 into the foundational rock 103 (in another example, the ground). Generally, these anchors 102 are metallic and made from materials, such as steel, and are grouted into the foundational rock 103 through potential fracture zones. The anchors 102 are designed to strengthen the dam's stability by enforcing static equilibrium between forces acting on the monoliths 104.

Figure 3:
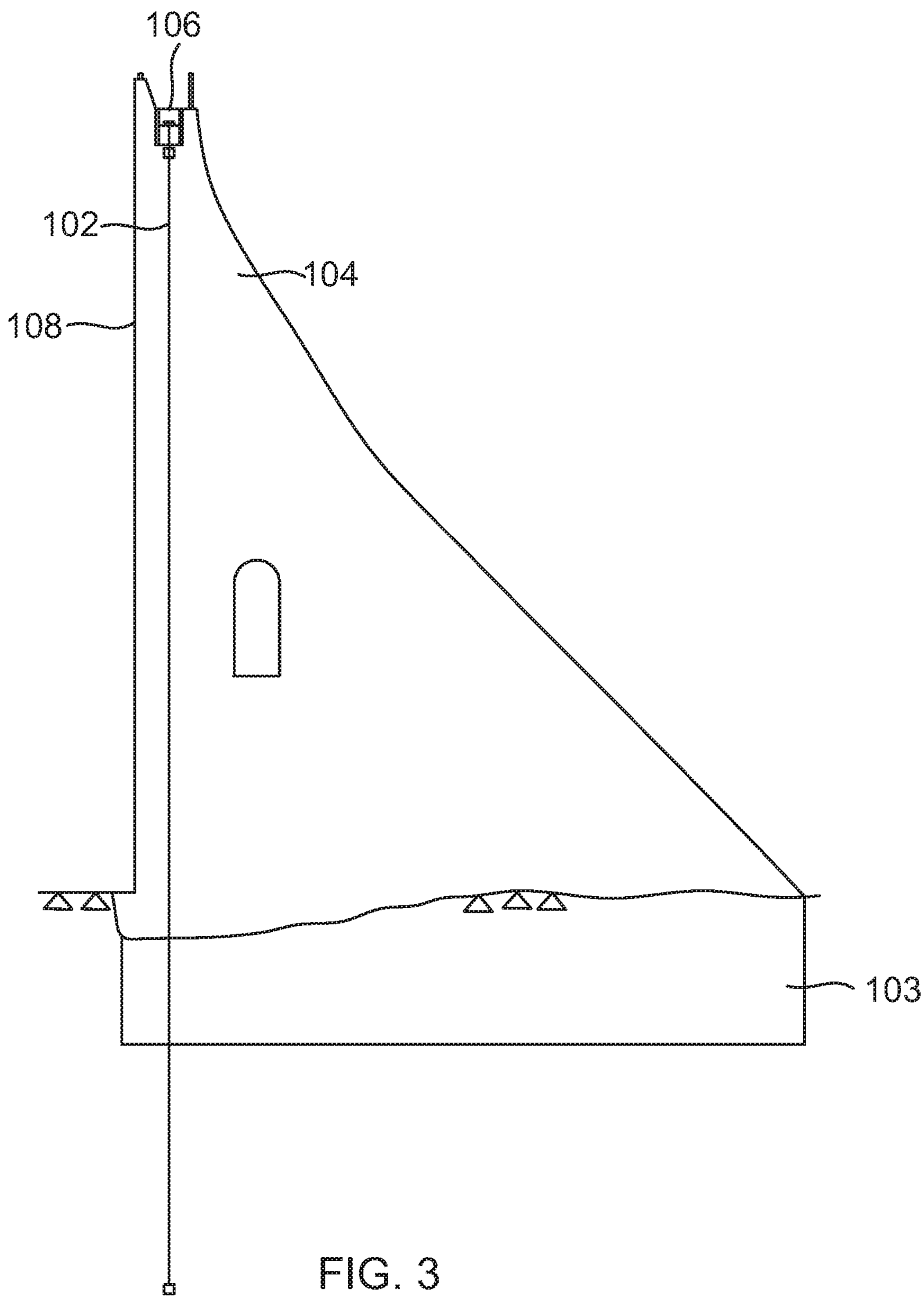
FIG. 3 shows a cross sectional view of the dam with a more detailed view of an anchor embedded in the monoliths of the dam shown in FIG. 1.

Referring now to FIG. 1, FIG. 2, and FIG. 3, FIG. 3 shows a cross sectional view of the dam 100 with a more detailed view of an anchor 102 embedded in the monoliths 104 of the dam 100. As shown, the cross section is taken in a plane along a stream direction SD and a vertical direction VD with respect to the dam 100. The cross-stream direction CD comes out of the page with respect to FIG. 3. The stream direction SD, the cross-sectional direction, and the vertical direction VD are all orthogonal to one another. The stream direction SD is a direction that points in the average direction in which water flows with respect to the dam 100 (can be determined from the direction of the pressure force of water on the dam). The cross-stream direction CD is the horizontal direction that is orthogonal to the stream direction SD while the vertical direction VD is vertical with respect to the earth (can be determined by the direction of gravity). In this embodiment, the anchor 102 has a bar 108 that extends through the monolith 104 into the foundational rock 103. The bar 108 has been set into the foundational rock 103 through grout encapsulation.

Anchors 102 may be temporary or permanent and may be passive or post-tensioned. Anchors 102 can also vary in length and diameter and in their essential tensile capacity. In some embodiments, like the embodiment shown in FIG. 3, the anchor 102 includes an anchor head 106 that is accessible from an exterior of the dam 100 and can be used to adjust the tension of the anchor 102 (i.e., post-tensioned anchors). This application discusses techniques determining the tension of the anchors 102 without damaging the dam 100. Thus, the anchor's tension can be determined while maintaining the anchor 102 embedded and unexposed within the dam 100 and foundational rock 103. More specifically, the described techniques do not require access to the anchor(s) 102 or the anchor head 106, may performed without altering the stress or lock-off loads in the anchors, can be accomplished without significantly altering the condition of the anchor 102, do not require the use of complex numerical models of the dam 100 or its anchors 102, and can engage the entire dam 100 in the evaluation, which provides additional benefits for evaluating the combined state of the anchored dam 100.

As explained in further detail below, this is done by measuring an empirical dynamic impulse response of the dam 100. This is counterintuitive to engineers since generally the anchors 102 are designed to provide static equilibrium and are not considered dynamic components in the dam 100. More specifically, the anchors 102 are static elements even when their design loads are approached or exceeded. However, one of the discoveries that allows the disclosed techniques to work is that the empirical dynamic impulse response of the dam 100 can be provided such that the dynamic behavior of the anchors 102 can be isolated from the behavior of the monoliths 104. To do this, the impulse provided has to generate a dynamic impulse frequency response having sufficient frequency content to capture both the dynamic behavior of the monoliths 104 and of the anchors 102. After obtaining the appropriate dynamic impulse response, models of the anchor 104 are used to determine the tension value of an anchor 102.

Figure 4:
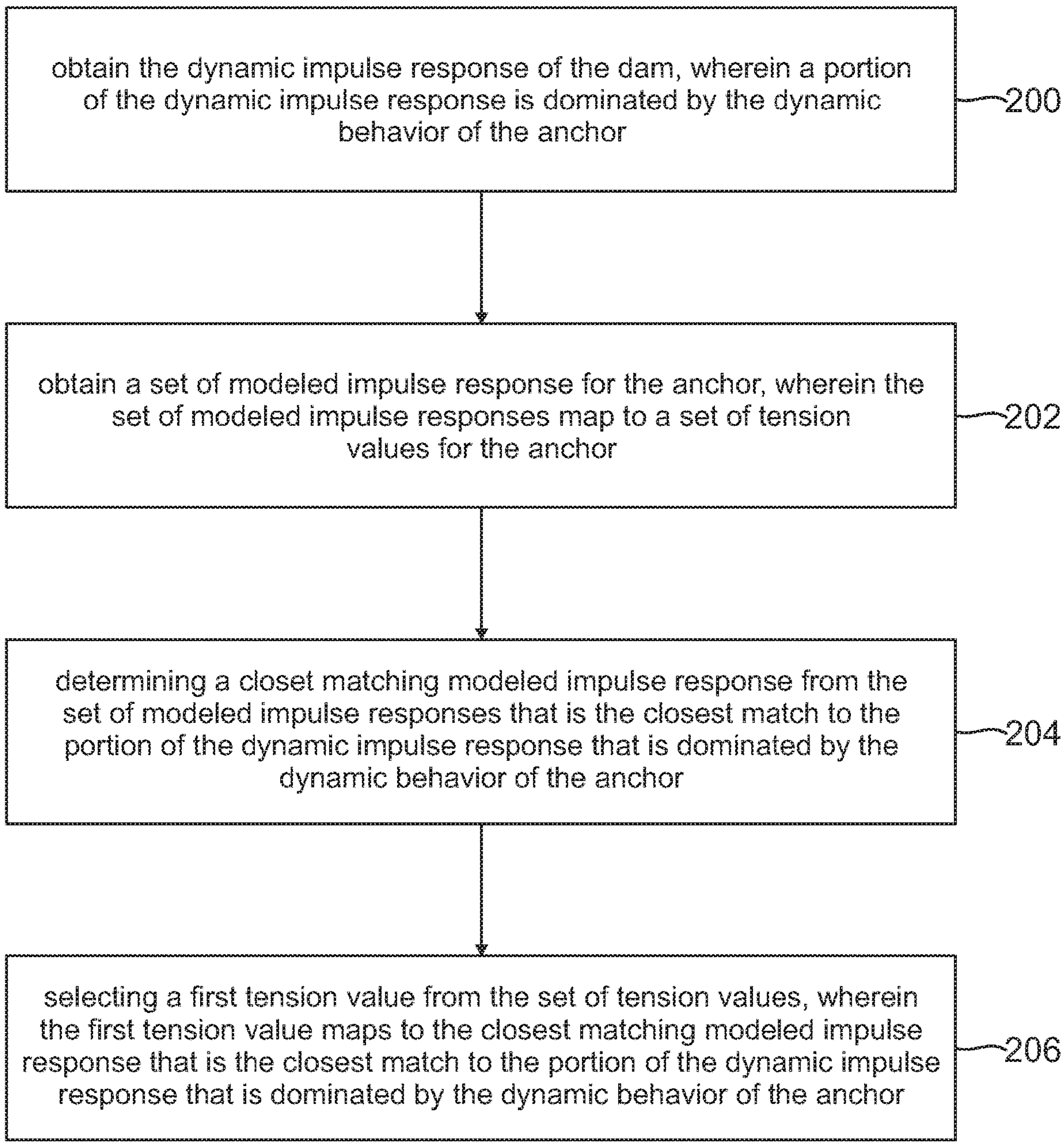
FIG. 4 illustrates an exemplary method of determining a tension of one of anchors embedded in a dam.

Referring now to FIG. 4, FIG. 4 illustrates an exemplary method of determining a tension of one of the anchors 102 embedded in the dam 100. It should be noted that the following procedures may be performed for different anchors 102 in parallel to obtain the tension of multiple anchors 102. However, the procedures are explained with respect to one of the anchors 102 with the understanding that the procedures may be repeated at least partially in parallel to obtain the tension of other anchors 102. To do this, the empirical dynamic impulse response of the dam 100 is obtained, wherein a portion of the empirical dynamic impulse response is dominated by a dynamic behavior of the anchor 102 (procedure 200). To obtain this dynamic impulse response, the techniques employ short duration, high amplitude loads to induce broad-band, transient behavior in the dam 100. Contained in the empirical dynamic impulse response are the dam 100. To target a specific one of the anchors 102, the empirical dynamic impulse response of the dam 100 should be obtained at and/or near the anchor 102. Although these transient responses may contain behavior associated with other features of the dam 100, the analysis techniques are provided to isolate the dynamic behavior of the anchor 102.

Figure 5:
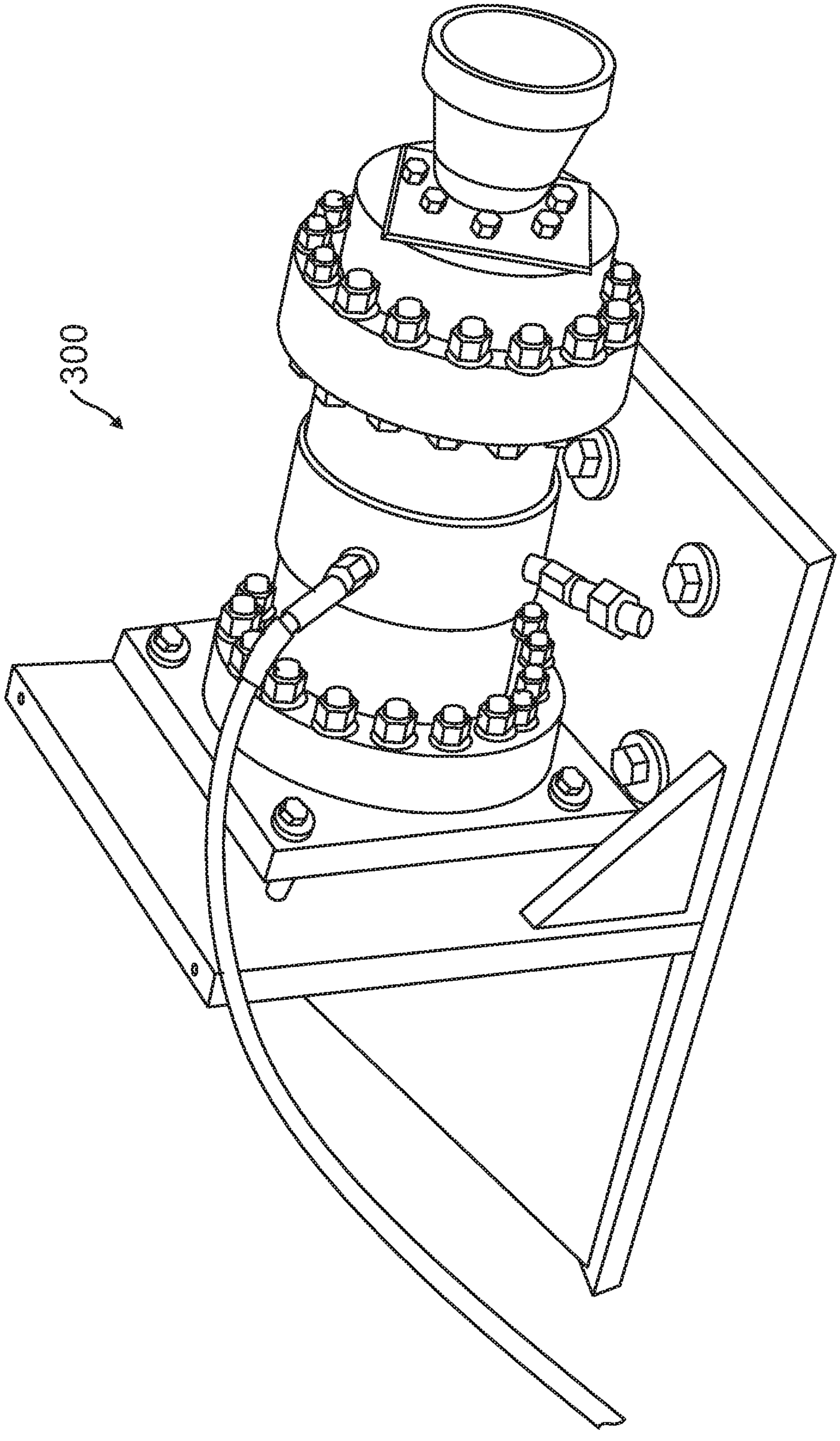
FIG. 5 illustrates one embodiment of a cold gas thruster (CGT), which may be used in order to acquire the empirical dynamic impulse response with the portion that is dominated by the dynamic behavior of the anchor.

More specifically, even though the anchors 102 may be loaded to large tension values (near or more than 1000 kips), the dam's fundamental dynamic impulse behavior is not highly influenced by the presence of the anchors 102. FIG. 5 is a table comparing the dam's fundamental, second, and third resonant frequencies (the three lowest resonant frequencies) before the installation of the anchors 102 and after the installation of the anchors 102. As can be seen from the table, the anchors 102 did not make a significant impact on the dam's fundamental, second, and third resonant frequencies (the three lowest resonant frequencies). The anchors 102 therefore did not make a significant impact on the dynamic impulse response below 100 Hertz, and mainly between 250-2500 Hz. This is because the anchors 102 are designed to strengthen the static equilibrium between the forces acting on the monoliths 104.

However, by realizing the manner in which the anchors 102 are installed in the dam 100, on can determine how to isolate the dynamic behavior of the anchors 102. In FIG. 3, the anchor 102 is a multi-strand anchor than includes a bond length and a free-stressing length in their design. The anchor 102 is grease sheathed, grouted from its bond zone along a predetermined length, tensioned and locked off, grouted again along its remaining length, and then capped (i.e. covered) at the crest. As such, the concrete in the monoliths 104 in which the anchor 102 is function as a medium that transmits anchor vibrations to a location where the anchor vibrations can be captured (i.e. measured). Thus, it was realized that the anchor's dynamic behavior should dominate at higher frequency values due to the confined space and high tension loads around and in the anchor 102. The confined space prohibits all but high gradient, low amplitude anchor resonant behavior, which when combined with the high tension load in the anchor, should correspond to high frequency resonances. With regard to the embodiment shown in FIG. 3, the portion of the empirical dynamic impulse response dominated by the dynamic behavior of the anchor 102 is the portion of the empirical dynamic impulse response that is greater than 100 Hertz and mainly between 250-2500 Hz. It should be noted that the empirical dynamic impulse response of the dam 100 may be obtained in more than one direction. The dynamic behavior of the anchor 102 is often seen in all three directions (stream, cross-stream, and vertical directions). Thus, in some implementations, obtaining the empirical dynamic impulse response of the anchor includes: 1) obtaining a first dynamic impulse response of the dam 100 in the stream direction, 2) obtaining a second dynamic impulse response of the dam 100 in the cross-stream direction, and 3) obtaining a third dynamic impulse response of the dam 100 in the vertical direction. Each of the first, second, and third dynamic responses will include a portion that is dominated by the dynamic behavior of the anchor 102. More specifically, a portion of the first dynamic impulse response measured in the stream direction is dominated by the dynamic behavior of the anchor 102, a portion of the second dynamic impulse response measured in the cross-stream direction is dominated by the dynamic behavior of the anchor 102, and a portion of the third dynamic impulse response measured in the vertical direction is dominated by the dynamic behavior of the anchor 102. The portion of each of the empirical dynamic impulse responses in the different directions that is dominated by the dynamic behavior of the anchor 102 is the portion of each of the empirical dynamic impulse responses that is greater than 100 Hertz and mainly between 250-2500 Hz.

Once the empirical dynamic impulse response of the dam 100 is known, this isolated dynamic behavior of the anchors 102 can be compared to the modeled behavior of the anchors 102 at different tension values to determine the tension value of an anchor 102. Thus, a set of modeled impulse responses for the anchor 102 are obtained (procedure 202). The set of modeled impulse responses map to a set of tension values for the anchor 102. Since the dynamic behavior of the anchor 102 can be isolated from the dynamic impulse response of the dam 100, simple continuous models can be used to model the behavior of the anchor 102 at different tension values. In fact, various different models of the anchor 102 may be used and the modeled responses in various directions may be used. As such, the set of modeled impulse responses for the anchor 102 may include a first set of first modeled impulse responses for the anchor 102 in the stream direction and a second set of second modeled impulse responses for the anchor 102 in the cross stream direction, and a third set of third modeled impulse responses for the anchor 102 in the vertical direction. Different subsets of each of these sets of modeled impulse responses may also be of different types of models. For example, as discussed below, three different types of models may be used to model the anchor 102. The first set of first modeled impulse responses for the anchor 102 in the stream direction may include a set of modeled impulse responses for a first type of model of the anchor 102, a set of modeled impulse responses for a second type of model of the anchor 102, and a set of modeled impulse responses for a third type of model of the anchor 102 (each in the stream direction). Additionally, the second set of second modeled impulse responses for the anchor 102 in the cross-stream direction may also include a set of modeled impulse responses for the first type of model of the anchor 102, a set of modeled impulse responses for the second type of model of the anchor 102, and a set of modeled impulse responses for the third type of model of the anchor 102 (each in the cross-stream direction). Finally, the third set of third modeled impulse responses for the anchor 102 in the vertical direction may also include a set of modeled impulse responses for the first type of model of the anchor 102, a set of modeled impulse responses for the second type of model of the anchor 102, and a set of modeled impulse responses for the third type of model of the anchor 102 (each in the vertical direction). Each of these modeled impulse responses will model the dynamic behavior of the anchor 102 at a different tension value and thus, each of these modeled impulse responses will map to a specific tension value.

Next, a closest matching modeled impulse response from the set of modeled impulse responses that is a closest match to the portion of the empirical dynamic impulse response that is dominated by the dynamic behavior of the anchor 102 is determined (procedure 204). To determine the closest match, the pattern of the modeled impulse responses and the pattern of the portion of the empirical dynamic impulse response obtained empirically should be compared using a mathematical analysis to determine which modeled impulse response is the closest fit to the empirical dynamic impulse response obtained empirically. One way of doing this, is by determining errors between each of the modeled impulse responses for the anchor 102 and the portion of the empirical dynamic impulse response that is dominated by the dynamic behavior of the anchor 102.

For example, a set of errors may be determined between the first portion of the first dynamic impulse response in the stream direction and the first set of first modeled impulse responses in the stream direction, a set of errors may be determined between the second portion of the second dynamic impulse response in the cross-stream direction and the second set of second modeled impulse responses in the cross-stream direction, and a set of errors may be determined between the third portion of the third dynamic impulse response in the vertical direction and the third set of third modeled impulse responses in the vertical direction. Furthermore, each of these sets of errors may include a set of errors for each model type. Thus, the set of errors may be determined between the first portion of the first dynamic impulse response in the stream direction and the first set of first modeled impulse responses in the stream direction by determining a set of errors between the first portion of the first dynamic impulse response in the stream direction and a set of modeled impulse responses in the stream direction for the first type of model, another set of errors between the first portion of the first dynamic impulse response in the stream direction and a set of modeled impulse responses in the stream direction for the second type of model, and yet another set of errors between the first portion of the first dynamic impulse response in the stream direction and a set of modeled impulse responses in the stream direction for the third type of model.

Furthermore, the set of errors may be determined between the second portion of the second dynamic impulse response in the cross-stream direction and the second set of second modeled impulse responses in the cross-stream direction by determining a set of errors between the second portion of the second dynamic impulse response in the cross-stream direction and a set of modeled impulse responses in the cross-stream direction for the first type of model, another set of errors between the second portion of the second dynamic impulse response in the cross-stream direction and a set of modeled impulse responses in the cross-stream direction for the second type of model, and yet another set of errors between the second portion of the second dynamic impulse response in the cross-stream direction and a set of modeled impulse responses in the cross-stream direction for the third type of model. Finally, the set of errors may be determined between the third portion of the third dynamic impulse response in the vertical direction and the third set of third modeled impulse responses in the vertical direction by determining a set of errors between the third portion of the third dynamic impulse response in the vertical direction and a set of modeled impulse responses in the vertical direction for the first type of model, another set of errors between the third portion of the third dynamic impulse response in the vertical direction and a set of modeled impulse responses in the vertical direction for the second type of model, and yet another set of errors between the third portion of the third dynamic impulse response in the vertical direction and a set of modeled impulse responses in the vertical direction for the third type of model.

Thus, subsets of the errors will be based on both direction and model type. These subsets of errors will then be combined as subsets in the total set of errors to determine which of the modeled impulse responses most closely matches the pattern of the empirical dynamic impulse response obtained in a corresponding direction. Any mathematical technique capable of comparing the patterns of the respective portion of the empirical dynamic impulse response to a modeled impulse response can be used to determine the set of errors. However, one way of doing this is by comparing the resonant frequencies of the empirical dynamic impulse response and the resonant frequencies of a modeled impulse response in order to determine a set of errors.

Thus, determining the set of errors between the first portion of the first dynamic impulse response in the stream direction and the set of modeled impulse responses in the stream direction for the first type of model may be performed by various subprocedures. In one implementation, a set of resonant frequencies from the first portion of the first dynamic impulse response in the stream direction is obtained. For each modeled impulse response of the first model type in the stream direction, a set of resonant frequencies of the modeled impulse response are obtained and an error between the set of resonant frequencies of the first portion of the first dynamic impulse response in the stream direction and the set of resonant frequencies of the particular modeled impulse response of the first model type in the stream direction is determined. This particular modeled impulse response of the first model type in the stream direction will be mapped to a tension value and the error will thus indicate how closely this particular modeled impulse response matches the first portion of the first dynamic impulse response in the stream direction. The process is repeated for all of the modeled impulse response of the first model type in the stream direction that are mapped to tension values to obtain one subset of the errors.

Similarly, for each modeled impulse response of the second model type in the stream direction, a set of resonant frequencies of the modeled impulse response are obtained and an error between the set of resonant frequencies of the first portion of the first dynamic impulse response in the stream direction and the set of resonant frequencies of the particular modeled impulse response of the second model type in the stream direction is determined. This particular modeled impulse response of the second model type in the stream direction will be mapped to a tension value and the error will thus indicate how closely this particular modeled impulse response matches the first portion of the first dynamic impulse response in the stream direction. The process is repeated for all of the modeled impulse response of the second model type in the stream direction that are mapped to tension values to obtain another subset of the errors.

Furthermore, for each modeled impulse response of the third model type in the stream direction, a set of resonant frequencies of the modeled impulse response are obtained and an error between the set of resonant frequencies of the first portion of the first dynamic impulse response in the stream direction and the set of resonant frequencies of the particular modeled impulse response of the third model type in the stream direction is determined. This particular modeled impulse response of the third model type in the stream direction will be mapped to a tension value and the error will thus indicate how closely this particular modeled impulse response matches the first portion of the first dynamic impulse response in the stream direction. The process is repeated for all of the modeled impulse response of the third model type in the stream direction that are mapped to tension values to obtain yet another subset of the errors.

Next, determining the set of errors between the second portion of the second dynamic impulse response in the cross-stream direction and the set of modeled impulse responses in the cross-stream direction for the first type of model may be performed by various subprocedures. In one implementation, a set of resonant frequencies from the second portion of the second dynamic impulse response in the stream direction is obtained. For each modeled impulse response of the first model type in the cross-stream direction, a set of resonant frequencies of the modeled impulse response are obtained and an error between the set of resonant frequencies of the second portion of the second dynamic impulse response in the cross-stream direction and the set of resonant frequencies of the particular modeled impulse response of the first model type in the cross-stream direction is determined. This particular modeled impulse response of the first model type in the cross-stream direction will be mapped to a tension value and the error will thus indicate how closely this particular modeled impulse response matches the second portion of the second dynamic impulse response in the stream direction. The process is repeated for all of the modeled impulse response of the first model type in the cross-stream direction that are mapped to tension values to obtain one subset of the errors.

Similarly, for each modeled impulse response of the second model type in the cross-stream direction, a set of resonant frequencies of the modeled impulse response are obtained and an error between the set of resonant frequencies of the second portion of the second dynamic impulse response in the cross-stream direction and the set of resonant frequencies of the particular modeled impulse response of the second model type in the cross-stream direction is determined. This particular modeled impulse response of the second model type in the cross-stream direction will be mapped to a tension value and the error will thus indicate how closely this particular modeled impulse response matches the second portion of the second dynamic impulse response in the stream direction. The process is repeated for all of the modeled impulse response of the second model type in the cross-stream direction that are mapped to tension values to obtain another subset of the errors.

Furthermore, for each modeled impulse response of the third model type in the cross-stream direction, a set of resonant frequencies of the modeled impulse response are obtained and an error between the set of resonant frequencies of the second portion of the second dynamic impulse response in the cross-stream direction and the set of resonant frequencies of the particular modeled impulse response of the third model type in the cross-stream direction is determined. This particular modeled impulse response of the third model type in the cross-stream direction will be mapped to a tension value and the error will thus indicate how closely this particular modeled impulse response matches the second portion of the second dynamic impulse response in the stream direction. The process is repeated for all of the modeled impulse response of the third model type in the cross-stream direction that are mapped to tension values to obtain yet another subset of the errors.

Finally, determining the set of errors between the third portion of the third dynamic impulse response in the vertical direction and the set of modeled impulse responses in the vertical direction for the first type of model may be performed by various subprocedures. In one implementation, a set of resonant frequencies from the third portion of the third dynamic impulse response in the stream direction is obtained. For each modeled impulse response of the first model type in the vertical direction, a set of resonant frequencies of the modeled impulse response are obtained and an error between the set of resonant frequencies of the third portion of the third dynamic impulse response in the vertical direction and the set of resonant frequencies of the particular modeled impulse response of the first model type in the vertical direction is determined. This particular modeled impulse response of the first model type in the vertical direction will be mapped to a tension value and the error will thus indicate how closely this particular modeled impulse response matches the third portion of the third dynamic impulse response in the stream direction. The process is repeated for all of the modeled impulse response of the first model type in the vertical direction that are mapped to tension values to obtain one subset of the errors.

Similarly, for each modeled impulse response of the second model type in the vertical direction, a set of resonant frequencies of the modeled impulse response are obtained and an error between the set of resonant frequencies of the third portion of the third dynamic impulse response in the vertical direction and the set of resonant frequencies of the particular modeled impulse response of the second model type in the vertical direction is determined. This particular modeled impulse response of the second model type in the vertical direction will be mapped to a tension value and the error will thus indicate how closely this particular modeled impulse response matches the third portion of the third dynamic impulse response in the stream direction. The process is repeated for all of the modeled impulse response of the second model type in the vertical direction that are mapped to tension values to obtain another subset of the errors.

Furthermore, for each modeled impulse response of the third model type in the vertical direction, a set of resonant frequencies of the modeled impulse response are obtained and an error between the set of resonant frequencies of the third portion of the third dynamic impulse response in the vertical direction and the set of resonant frequencies of the particular modeled impulse response of the third model type in the vertical direction is determined. This particular modeled impulse response of the third model type in the vertical direction will be mapped to a tension value and the error will thus indicate how closely this particular modeled impulse response matches the third portion of the third dynamic impulse response in the stream direction. The process is repeated for all of the modeled impulse response of the third model type in the vertical direction that are mapped to tension values to obtain yet another subset of the errors. A tension value from the set of tension values for the anchor 102 (procedure 206). The selected tension value maps to the closest matching modeled impulse response that is the closest match to the portion of the empirical dynamic impulse response that is dominated by the dynamic behavior of the anchor 102. With regard to the above described implementation, the selected tension value maps to the modeled impulse response (regardless of direction and model type) that resulted in the smallest error from the set of errors, described above.

It should be noted that while the embodiments discussed herein utilize resonant frequencies to characterize both the empirical dynamic impulse response and the modeled impulse response, other embodiments may use other function characteristics to model the empirical dynamic impulse response and the modeled impulse response. For example, in some embodiments, the anti-resonant frequencies may be utilized by themselves or in conjunction with the resonant frequencies in order to characterize the empirical dynamic impulse response and the modeled impulse response in order to determine tension values. In other embodiments, other techniques for characterizing and comparing functions may be utilized to determine the closest match between the empirical dynamic impulse response and the modeled impulse response so as to select the appropriate tension value for the anchor.

FIG. 5 illustrates one embodiment of a cold gas thruster (CGT) 300, which may be used in order to acquire the empirical dynamic impulse response with the portion that is dominated by the dynamic behavior of the anchor 102. The CGT 300 is utilized because the CGT 300 is configured to generate the short duration broadband impulse needed so as to produce the empirical dynamic impulse response in the dam 100 that has sufficient spectral information so that a portion of the empirical dynamic impulse response is dominated by the dynamic behavior of the anchors 102. In one embodiment, the CGT 300 is used to empirically obtain a dynamic impulse response of the dam 100 so that a portion of the empirical dynamic impulse response is dominated by the dynamic behavior of the anchor 102 being tested. More specifically, the CGT 300 is configured to deliver short duration, broad-band frequency loads to the monolith(s) 104 that embed the anchor 102 (See FIG. 3) being tested. The short duration, broad-band frequency loads delivered by the CGT 300 induce large amplitude, broad-band transient responses in each of the monolith(s) 104. The CGT 300 is operated by filling the main chamber with an inert gas (Nitrogen gas was used during testing) and allowing a diaphragm (e.g., an aluminum diaphragm) to burst. Upon rupture, the CGT 300 applies a force pulse to the dam 100 that results in the empirical dynamic impulse response of the dam 100.

Figure 6:
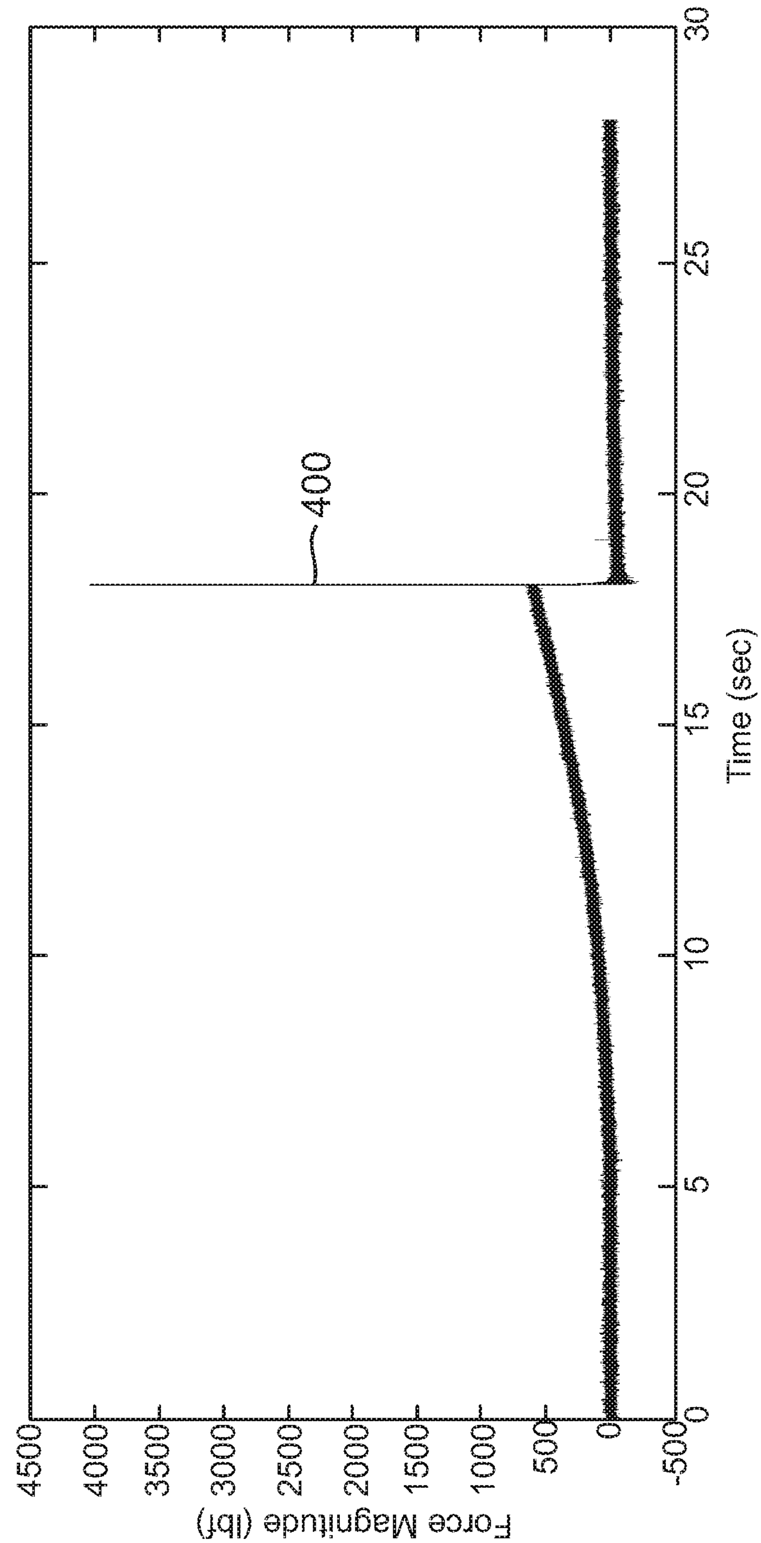
FIG. 6 is a timing graph that illustrates one example of a force pulse 400 that may be delivered by the CGT shown in FIG. 5.

FIG. 6 is a timing graph that illustrates one example of a force pulse 400 that may be delivered by the CGT 300. The vertical axis of the timing graph represents the force magnitude while the horizontal axis represents time. The force pulse 400 shown in FIG. 6 is generated by a CGT 300 with a 0.02 diaphragm. As shown by FIG. 6, the force builds as the pressure in the CGT's chamber increases during filling and reaches a value of approximately 600 lbf at diaphragm burst, and reaches a typical peak value of 4040 lbf. As such, the CGT 300 is configured to deliver high amplitude load levels over a short timeframe, on the order of 3 milliseconds. This allows the force pulse to be considered an "impulse" for testing the dam 100.

Figure 7A:
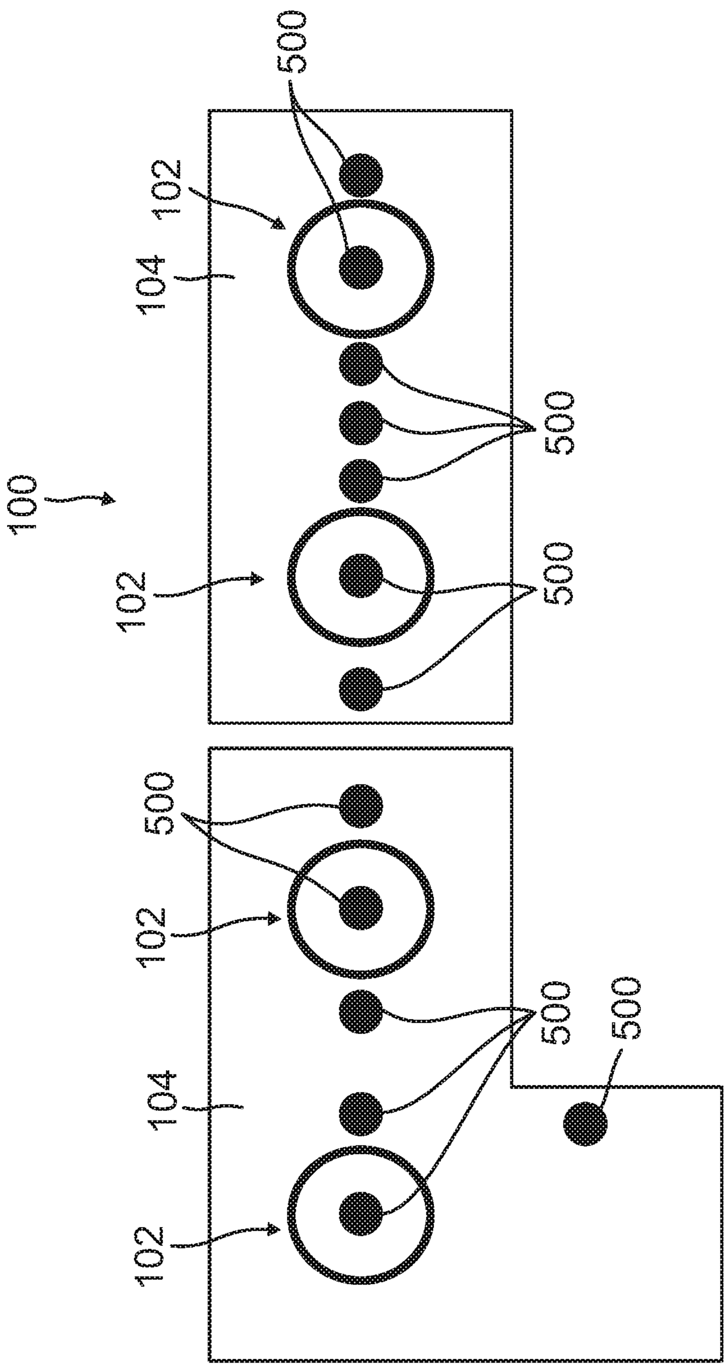
FIG. 7A and FIG. 7B are diagrams illustrating the measurement positions for obtaining the empirical dynamic impulse responses of four different anchors n two different monoliths of a dam.
Figure 7B:
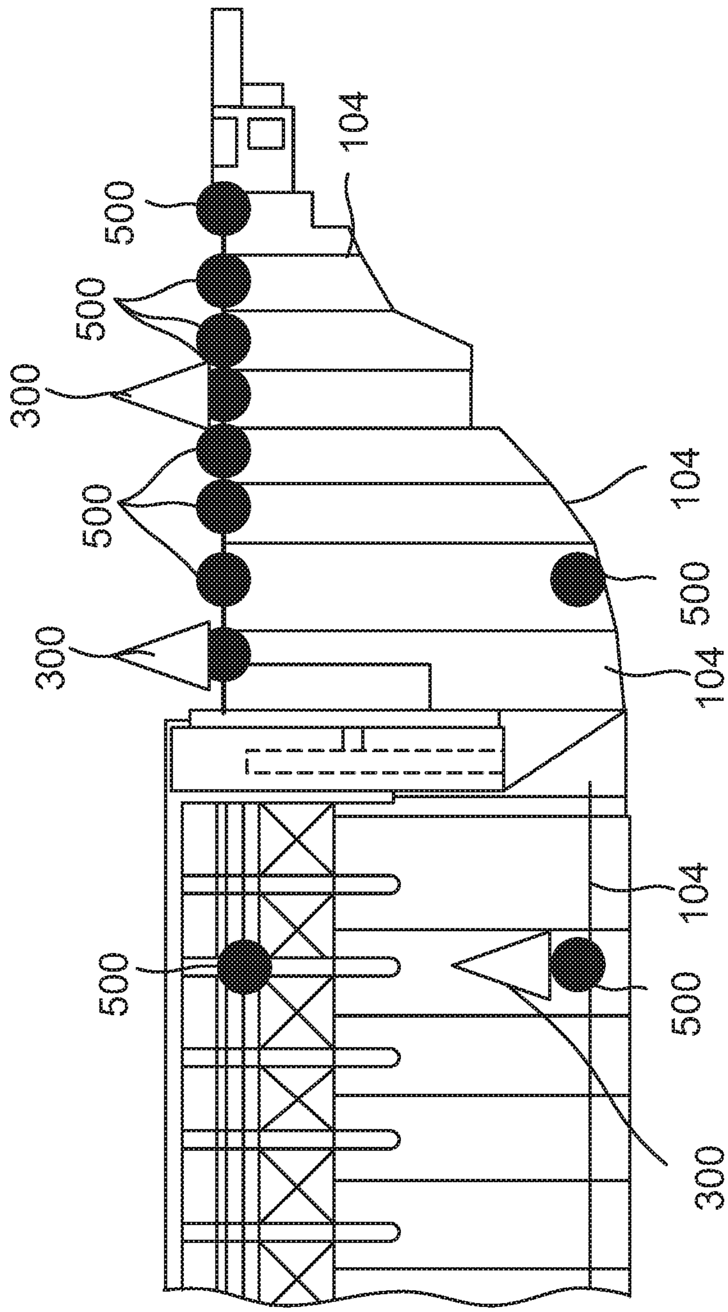

FIG. 7A and FIG. 7B are diagrams illustrating the measurement positions for obtaining the empirical dynamic impulse responses of four different anchors 102 in two different monoliths 104. FIG. 7A shows the crest of the monoliths 104 and FIG. 7B illustrates a front view of the dam 100. Both FIG. 7A and FIG. 7B illustrate measurement locations for measuring the empirical dynamic impulse response of the right most monoliths 104 of the dam 100. FIG. 7B also illustrates the positions of CGTs 300, which are utilized to generate the force pulse(s) 400. The force pulse 400 results in dynamic impulse responses in each of the tested monoliths 104. These dynamic impulse responses are measured with one or more sensors 500. The sensors 500 may be any type of sensors capable of capturing high frequency mechanical signals and in this specific embodiment are accelerometers. More specifically, the sensors 500 are configured to measure the empirical dynamic impulse responses in the stream, cross-stream, and vertical directions. As shown in FIG. 7A, at least one of the sensors 500 is positioned directly on the anchor heads 502 of the anchors 102. The other sensors 500 are positioned adjacent to the anchor heads 502 or along the faces of the monoliths 104 (See FIG. 7B). Of particular interest are the two anchors 102 in the right most monolith and one of the anchors 102 in the adjacent monolith 104, since these anchors 102 are configured to be retensioned.

Figure 8A:
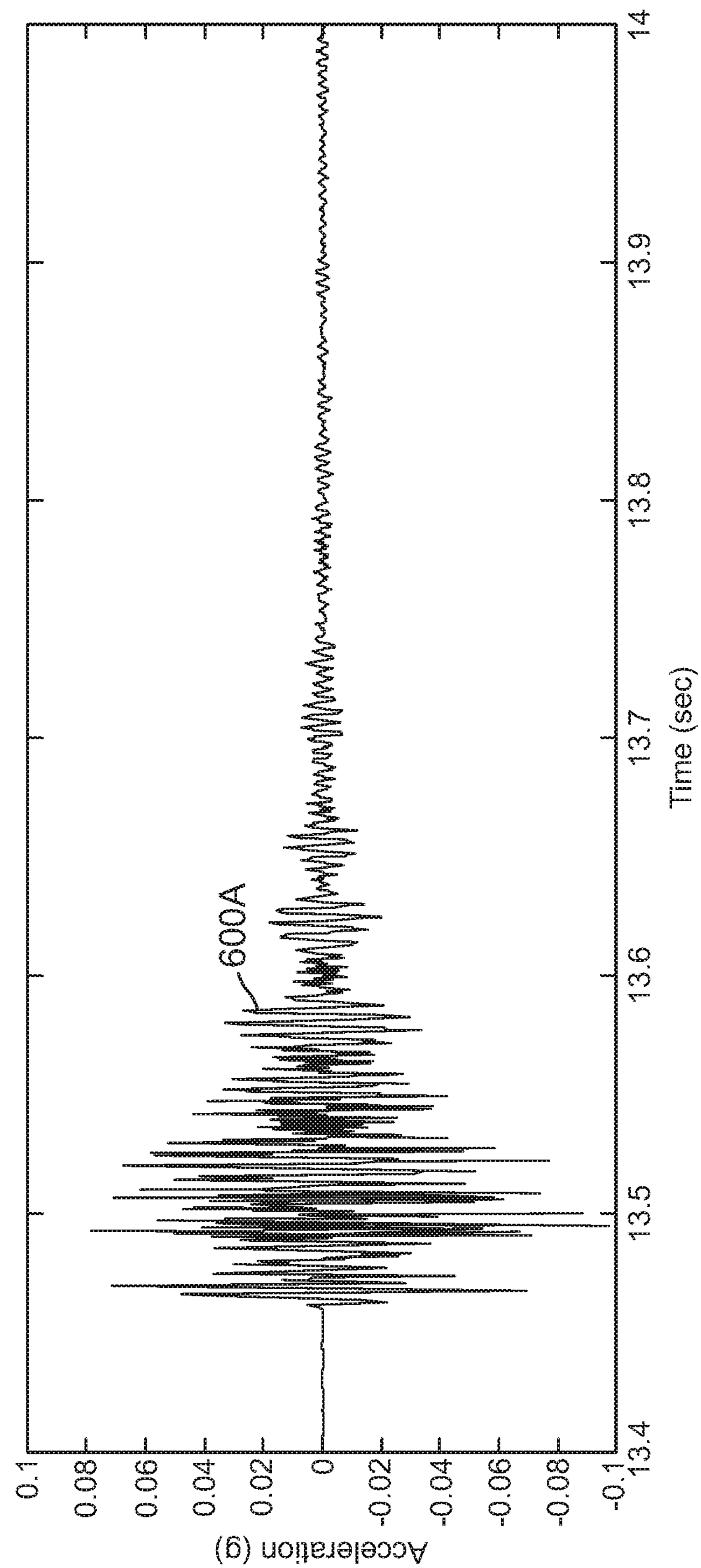
FIG. 8A and FIG. 8B illustrate an empirical dynamic impulse response of a dam obtained with CTGs.
Figure 8B:
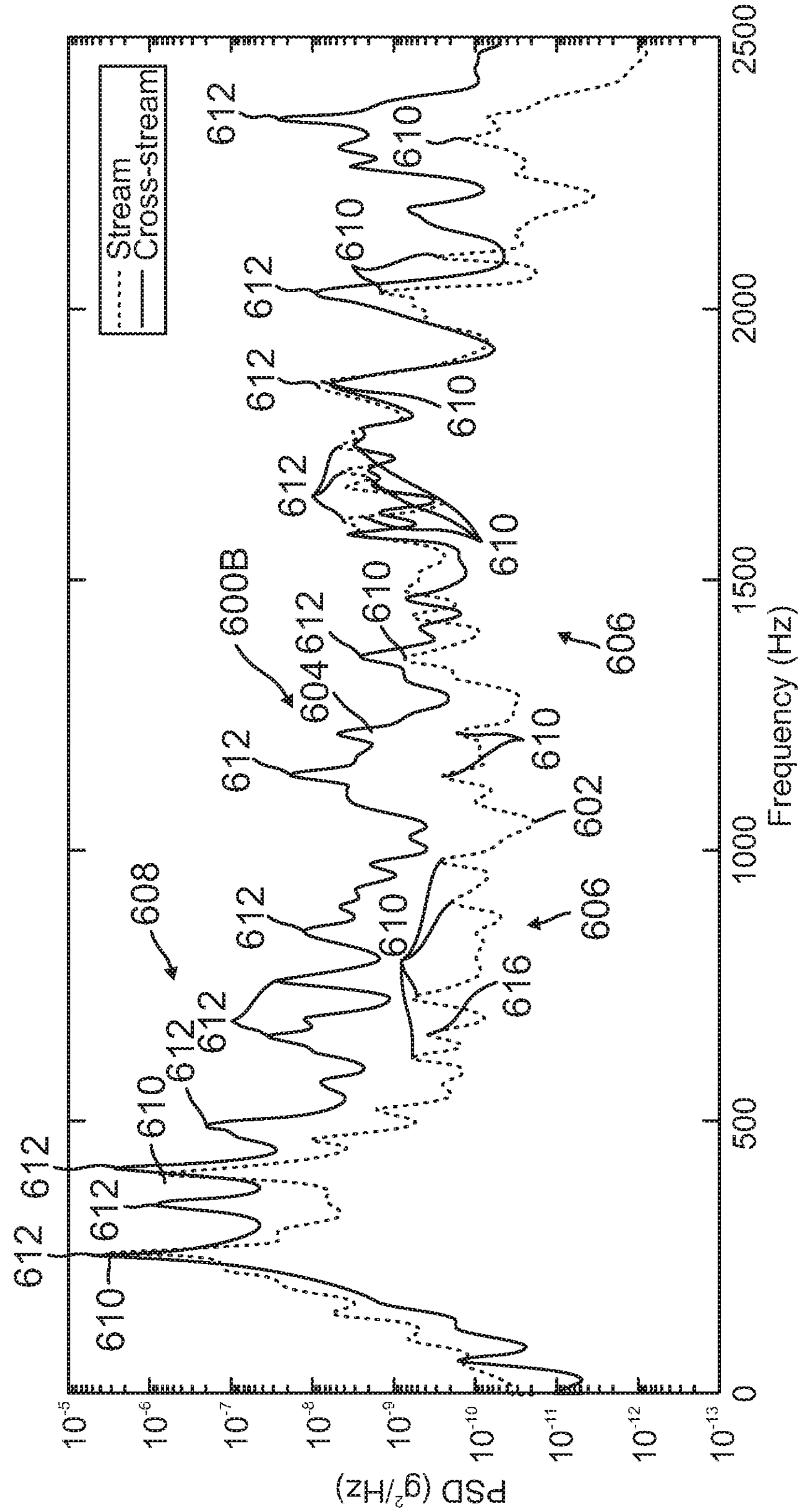

FIG. 8A and FIG. 8B illustrate a dynamic impulse response 600A, 600B. FIG. 8A shows a timing diagram of the empirical dynamic impulse response 600A. Even from the timing diagram, the empirical dynamic impulse response 600A can be seen to have broad frequency content that transitions from high frequencies (>100 Hz), to middle frequencies (between 30-100 Hz), and then to low frequencies (below 30 Hz) frequencies. In this example, the empirical dynamic impulse response 600A dissipates in approximately 250 milliseconds which is twice as fast as an unanchored monolith.

FIG. 8B illustrates a graph showing a dynamic impulse response 600B of one of the anchors 102 (anchor labeled 47 in the frequency domain. In this example, the graph is shown in the form of a Power Spectral Density (PSD). The empirical dynamic impulse response includes a dynamic impulse response 602 measured in the stream direction and a dynamic impulse response 604 measured in the cross stream direction. The empirical dynamic impulse response 600C may also include a dynamic impulse response in the vertical direction (not explicitly shown). The empirical dynamic impulse response 600B has broad frequency content where the a first portion 606 of the empirical dynamic impulse response 602 and a second portion 608 of the empirical dynamic impulse response 604 are dominated by the dynamic behavior of the particular anchor 102 being tested. The first portion 606 of the empirical dynamic impulse response 602 can be characterized by a set of resonant frequencies 610. Similarly, the second portion 608 of the empirical dynamic impulse response 604 can also be characterized by a set of resonant frequencies 612. Resonances are seen well beyond 500 Hz, which is much broader than the typical seismic hazard spectrum (defined between 0.1-100 Hz). In fact, resonant frequencies, 610, 612 are seen beyond 1600 Hz, where an antialiasing filter was set for this measurement.

Identifying the resonant frequencies 610, 612 of the isolated anchor behavior identified from the empirical dynamic impulse responses 602, 604 can be based on a few assumptions. In particular, the resonant frequencies 610, 612 can be presumed to be high frequency valued due to the confined space and high tension loads that exist around and in the anchor 102. The confined space prohibits all but high gradient, low amplitude anchor resonant behavior, which when combined with the high tension load in the anchor 102, should correspond to high frequency resonances 610, 612.

The high frequency anchor resonances 610, 612 are well outside the frequency band or region where significant response is presumed to exist in the dam-foundation-reservoir system. Anchor resonant behavior should be observed in spectral responses associated with each of the directions measured. In other words, anchor resonances can be observed in the stream, cross-stream, and in the vertical directions. For the evaluation in FIG. 8A and FIG. 8B, only the stream and cross-stream responses were used. However, vertical responses can be obtained as well. Pattern matching can also consider the similarity of the responses in the different directions. For example, pattern matching can consider the character or shape of the spectral peaks in a particular frequency band or region, and where similar patterns exist in both stream and cross-stream directions, isolated anchor behavior may be indicated.

In each model, the anchor 102 is represented as a continuous beam under (unknown) tension load, T, and whose geometric and material properties are determined from the actual anchor design and installation. The different models may be utilized as the exact conditions of each of the models in not known.

Figure 9C:
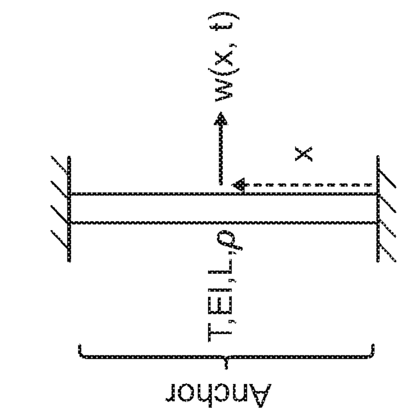
FIG. 9A-FIG. 9C illustrate different models used to model the dynamic behavior of an anchor.
Figure 9B:
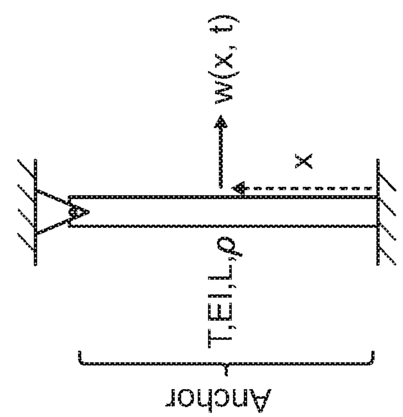
Figure 9A:
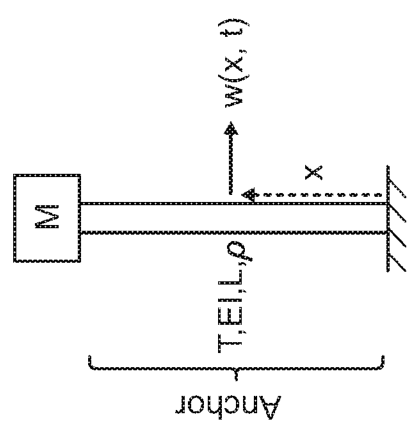

With regards to the model shown in FIG. 9A, the anchor 102 is assumed to be fixed on one end and free on the other. The primary connection to the monolith, at the top of the anchor 102, is modelled by a lumped mass (M) affixed to the free end of the beam. At higher resonant frequencies, the magnitude of modal displacement is assumed to be less than the cross-sectional radius of the hole, such that the anchor will not contact the dam when vibrating laterally, apart from the anchor's top attachment. The equation governing the lateral displacement as a function of position along the beam is again given by equation 1.

$$u(x)=C_1\cosh(s_1x)+C_2\sinh(s_1x)+C_3\cos(s_2x)+C_4\sin(s_2x) \qquad \text{Equation 1:}$$

Four boundary conditions define this problem. The first set of conditions describes the effect of a translational mass attached at the end of the beam. Specifically, since the end is free with a point mass attached, there is zero moment and the translational mass is accounted for by a discontinuity in shear.

The next set of boundary conditions describes how the bottom end of the beam is fixed, so the slope and displacement at this end are both zero. Applying these four boundary conditions allows us to solve for the four unknown constants. The result is shown below in Equation 2.

$$s_1=((T+(T^2+4EIpw^2)^{1/2})/2EI)^{1/2};s_2=((T+(T^2+4EIpw^2)^{1/2}-T)/2EI)^{1/2}$$

$$(Mw^2/EI)(\sinh(s_1L)\cos(s_2L)-(s_1/s_2)\sin(s_2L)\cosh(s_1L))+s_1(s_1^{\,4}+s_2^{\,4})+s_1^{\,2}s_2(2s_1s_2\cos(s_2L)\cosh(s_1L)+(s_2^{\,2}-s_1^{\,2})\sin(s_2^{\,2}L)\sinh(s_1L)=0$$

FIG. 9B illustrates a fixed pinned model of an anchor. A similar continuous Euler-Bernoulli beam model, with the appropriate boundary conditions, will have the same basis function shown in equation 1 above. The boundary conditions at the fixed end remain the same. However, rather than lumped mass at the top, we have a pin. This requires zero displacement and zero applied moment. Solving for our four unknowns given these four equations from the boundary conditions provides the frequency equation. Thus, the frequency equation for a Fixed-Pinned model of an anchor 102 is given by Equation 3.

$$s_1=((T+(T^2+4EIpw^2)^{1/2})/2EI)^{1/2};s_2=((T+(T^2+4EIpw^2)^{1/2}-T)/2EI)^{1/2}$$

$$(s_1w^3/s_2w)+s_1ws_2w\cosh s_1wL\sin s_2wL-((s_1w^2+s_2w^2)\cos 2wL\ \sinh s_1wL)=0$$

With regard to FIG. 9C, FIG. 9C illustrates a fixed model for the anchor 102. Again, the equation 1 is still valid as a displacement equation for the model shown in FIG. 9C just as it was valid for the models shown in FIG. 9B and FIG. 9C. The boundary conditions at the fixed end remain the same. However, the top end is also fixed implying that the slope and displacement at that end are zero. These four knowns allow us to solve for the four unknowns in our governing equation. Solving and simplifying gives the frequency equation of a Fixed-Fixed model of a continuous beam as shown in Equation 4.

$$s_1=((T+(T^2+4EIpw^2)^{1/2})/2EI)^{1/2};s_2=((T+(T^2+4EIpw^2)^{1/2}-T)/2EI)^{1/2}$$

$$2s_1w-2s_1w\cosh s_1wL\cos s_2wL+(s_1w^2/s_2w)-s_2w\sin s_2wL\sinh s_1wL=0 \quad \text{Equation 4:}$$

FIG. 10 illustrates a table with sets of resonant frequencies associated with tension values for the anchor 102, as determined by one of the models described above. Sets of errors between the empirically determined resonances and the resonances determined by the models can then be determined. Thus, there may be subsets of errors for each the stream, cross-stream, and vertical direction. Furthermore, for each direction (stream, cross-stream, and vertical direction), subsets of errors may be included for each model type. In one embodiment, the following error function was used.

$$(\text{Diff})_i^n=\text{abs}_i(f_n^{PBT}-f_n^{model}\ i=1\ \ldots\ N \text{ for each } n\text{th resonance identified}$$

$$\text{Error} = \sqrt[N]{\prod_{i=1}^{N}(Diff)_i^n}\ ,\ i=1\ \ldots\ N$$

where $(\text{Diff})_i^n$ is the absolute difference between the nth measured anchor resonance and its corresponding model resonance, and N is the number of matches identified between the measured anchor resonances and the tabulated model predicted resonances. The error is computed as the Nth root of the product of the N absolute differences. The error minimizes at the value of the estimated tension load in the anchor 102. Once the tension value of the anchor 102 is known, the tension of the anchor 102 can be adjusted to a desired tension value if needed.

Figure 11:
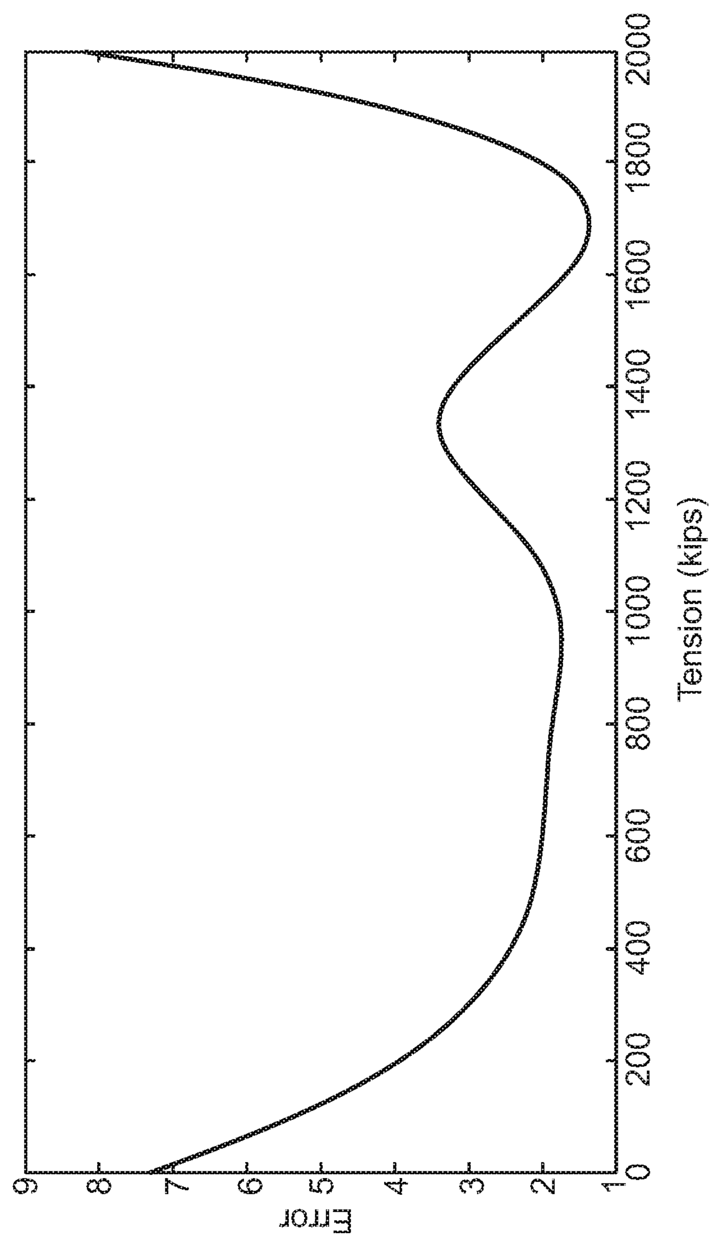
FIG. 11 illustrates a graph of one example of an error function.

FIG. 11 illustrates a graph of one example of an error function determined in accordance with the above described technique. The error function has been smoothed to highlight the trend as a function of tension, which reaches a minimum value 1650 kips the anchor 102. As such, 1650 kips is selected as the tension value of the anchor 102.

Figure 12:
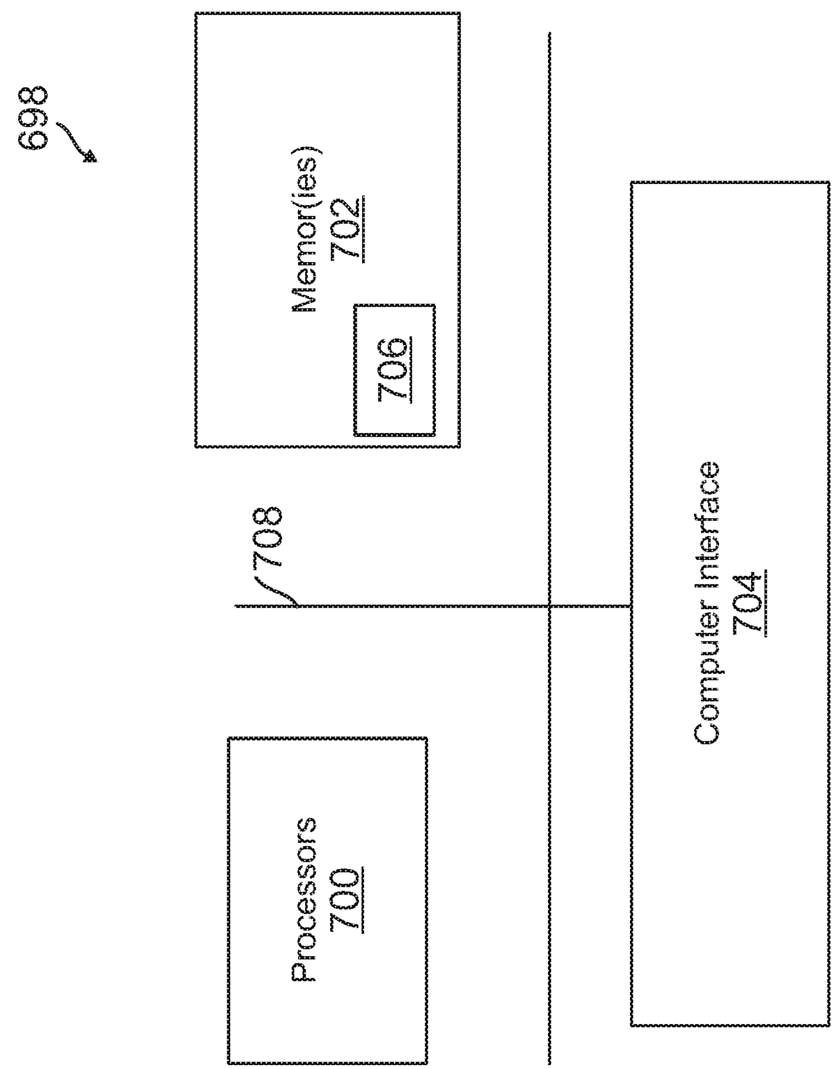
FIG. 12 illustrates one example of a computer device that may be utilized to perform the above describes techniques to determine the tension value of an anchor.

FIG. 12 illustrates one example of a computer device 698 that may be utilized to perform the above describes techniques to determine the tension value of an anchor 102. The computer device 698 may be any type of processor controlled device, such as, by way of example, personal computers, workstations, servers, clients, mini-computers, mainframe computers, laptop computers, smart phones, tablets, a network of one or more individual computers, mobile computers, portable computers, handheld computers, palm top computers, set top boxes for a TV, interactive televisions, interactive kiosks, personal digital assistants, interactive wireless devices, or any combination thereof.

As shown in FIG. 12, the computer device 698 includes one or more processor(s) 700, one or more memory(ies) 702, and a computer interface 704. Examples of processors 700 include any type of sequential state machine including microprocessors, graphics processing units (GPUs), central processing units (CPUs), digital signal processors (DSPs), reduced instruction set computing (RISC) processors, systems on a chip (SoC), baseband processors, and other suitable general purpose hardware configured to perform the various functionality described throughout this disclosure. Additionally, the computer device 698 may include one or more memories 702. A memory may include a memory storage device or an addressable storage medium which may include, by way of example, random access memory (RAM), static random access memory (SRAM), dynamic random access memory (DRAM), electronically erasable programmable read-only memory (EEPROM), programmable read-only memory (PROM), erasable programmable read-only memory (EPROM), hard disks, floppy disks, laser disk players, digital video disks, compact disks, video tapes, audio tapes, magnetic recording tracks, magnetic tunnel junction (MTJ) memory, optical memory storage, quantum mechanical storage, electronic networks, and/or other devices or technologies to store electronic content such as programs and data.

In particular, the one or more memories 702 may store computer executable instructions 706 that, when executed by the one or more processors 700, cause the one or more processors 700 to operate as discussed above with regards to FIG. 1-FIG. 11. The one or more processors 700 may be operably associated with the one or more memories 702 so that the computer executable instructions 706 can be provided to the one or more processors 700 for execution. For example, the one or more processors 700 may be operably associated to the one or more memories 702 through one or more buses 708. Furthermore, the computer device 698 may possess or may be operably associated with input devices (not explicitly shown) (e.g., a keyboard, a keypad, controller, a mouse, a microphone, a touch screen, a sensor) and output devices (not explicitly shown) such as (e.g., a computer screen, printer, or a speaker).

The computer device 698 may execute an appropriate operating system such as Linux, Unix, Microsoft® Windows®, Apple® MacOS®, IBM® OS/2®, Palm® OS, embedded operating systems such as Windows® CE, and/or the like. The computer device 698 may advantageously be equipped with a network communication device such as a network interface card, a modem, or other network connection device suitable for connecting to one or more networks.

Those skilled in the art will recognize improvements and modification to the preferred embodiments of the present disclosure. All such improvements and modifications are considered within the scope of the concepts disclosed herein and

What is claimed is:

1. A method of determining a tension of an anchor embedded in a dam, comprising:

empirically obtaining an empirical dynamic impulse response of the dam by applying a force pulse to the dam with a cold gas thruster and measuring the empirical dynamic impulse response generated as a result of the force pulse with one or more sensors, wherein a portion of the empirical dynamic impulse response is dominated by a dynamic behavior of the anchor;

obtaining a set of modeled impulse responses for the anchor, wherein the set of modeled impulse responses map to a set of tension values for the anchor;

determining a closest matching modeled impulse response from the set of modeled impulse responses that is a closest match to the portion of the empirical dynamic impulse response that is dominated by the dynamic behavior of the anchor; and selecting a first tension value from the set of tension values for the anchor, wherein the first tension value maps to the closest matching modeled impulse response that is the closest match to the portion of the empirical dynamic impulse response that is dominated by the dynamic behavior of the anchor.

2. The method of claim 1, wherein the set of modeled impulse responses for the anchor comprise a first set of first modeled impulse responses for a first type of model of the anchor, a second set of second modeled impulse responses for a second type of model for the anchor, and a third set of third modeled impulse responses for a third type of model for the anchor, wherein determining the closest matching modeled impulse response from the set of modeled impulse responses that is the closest match to the portion of the empirical dynamic impulse response comprises:

determining a first set of first errors between the first portion of the first dynamic impulse response and the first set of first modeled impulse responses;

determining a second set of second errors between the second portion of the second dynamic impulse response and the second set of second modeled impulse responses;

determining a third set of third errors between the third portion of the third dynamic impulse response and the third set of third modeled impulse responses;

selecting the closest matching modeled impulse response from the set of modeled impulse responses comprises selecting the closest matching modeled impulse response from the first set of first modeled impulse responses, the second set of second modeled impulse responses, and the third set of third modeled impulse responses such that the closest matching modeled impulse response corresponds to a smallest error in a combined set of the first set or errors, the second set of errors, and the third set of errors.

3. The method of claim 1, wherein at least one of the one or more sensors is positioned directly on an anchor head of the anchor.

4. The method of claim 1, wherein the portion of the empirical dynamic impulse response that is dominated by the dynamic behavior of the anchor is the portion of the empirical dynamic impulse response that located at frequencies greater than 100 Hertz.

5. The method of claim 1, wherein the portion of the empirical dynamic impulse response that is dominated by the dynamic behavior of the anchor is between 250 Hertz and 2500 Hertz.

6. The method of claim 1, wherein:

determining the closest matching modeled impulse response from the set of modeled impulse responses that is the closest match to the portion of the empirical dynamic impulse response comprises determining a set of errors between the portion of the empirical dynamic impulse response and the set of modeled impulse responses; and selecting the closest matching modeled impulse response from the set of modeled impulse responses comprises selecting such that the closest matching modeled impulse response corresponds to a smallest error in the set of the errors.

7. The method of claim 1, wherein empirically obtaining the empirical dynamic impulse response comprises:

obtaining a first dynamic impulse response of the dam in a stream direction, wherein the portion of the empirical dynamic impulse response comprises a first portion of the first dynamic impulse response that is dominated by the dynamic behavior of the anchor; and obtaining a second dynamic impulse response of the dam in a cross-stream direction, wherein the portion of the empirical dynamic impulse response further comprises a second portion of the second dynamic impulse response that is dominated by the dynamic behavior of the anchor.

8. The method of claim 7, wherein the set of modeled impulse responses for the anchor comprise a first set of first modeled impulse responses for the anchor in the stream direction and a second set of second modeled impulse responses for the anchor in the cross stream direction, wherein determining the closest matching modeled impulse response from the set of modeled impulse responses that is the closest match to the portion of the empirical dynamic impulse response comprises:

determining a first set of first errors between the first portion of the first dynamic impulse response and the first set of first modeled impulse responses;

determining a second set of second errors between the second portion of the second dynamic impulse response and the second set of second modeled impulse responses;

selecting the closest matching modeled impulse response from the set of modeled impulse responses comprises selecting the closest matching modeled impulse response from the first set of first modeled impulse responses and the second set of second modeled impulse responses such that the closest matching modeled impulse response corresponds to a smallest error in a combined set of the first set or errors and the second set of errors.

9. The method of claim 8, wherein:

determining the first set of first errors between the first portion of the first dynamic impulse response and the first set of first modeled impulse responses, comprises:

obtaining a first set of resonant frequencies from the first portion of the first dynamic impulse response;

for each first modeled impulse response in the first set of first modeled impulse responses, obtain a set of resonant frequencies of the first modeled impulse response and determine a first error of the first set of first errors between the first set of resonant frequencies and the set of resonant frequencies of the first modeled impulse response;

determining the second set of second errors between the second portion of the second dynamic impulse response and the second set of second modeled impulse responses, comprises:

obtaining a second set of resonant frequencies from the second portion of the second dynamic impulse response;

for each second modeled impulse response in the second set of second modeled impulse responses, obtain a set of resonant frequencies of the second modeled impulse response and determine a second error of the second set of second errors between the second set of resonant frequencies and the set of resonant frequencies of the second modeled impulse response.

10. The method of claim 1, wherein empirically obtaining the empirical dynamic impulse response comprises:

obtaining a first dynamic impulse response of the dam in a stream direction, wherein the portion of the empirical dynamic impulse response comprises a first portion of the first dynamic impulse response that is dominated by the dynamic behavior of the anchor;

obtaining a second dynamic impulse response of the dam in a cross-stream direction, wherein the portion of the empirical dynamic impulse response further comprises a second portion of the second dynamic impulse response that is dominated by the dynamic behavior of the anchor;

obtaining a third dynamic impulse response of the dam in a vertical direction, wherein the portion of the empirical dynamic impulse response comprises a third portion of the third dynamic impulse response that is dominated by the dynamic behavior of the anchor.

11. The method of claim 10, wherein the set of modeled impulse responses for the anchor comprise a first set of first modeled impulse responses for the anchor in the stream direction and a second set of second modeled impulse responses for the anchor in the cross stream direction, wherein determining the closest matching modeled impulse response from the set of modeled impulse responses that is the closest match to the portion of the empirical dynamic impulse response comprises:

determining a first set of first errors between the first portion of the first dynamic impulse response and the first set of first modeled impulse responses;

determining a second set of second errors between the second portion of the second dynamic impulse response and the second set of second modeled impulse responses;

determining a third set of third errors between the third portion of the third dynamic impulse response and the third set of third modeled impulse responses; and selecting the closest matching modeled impulse response from the set of modeled impulse responses comprises selecting the closest matching modeled impulse response from the first set of first modeled impulse responses, the second set of second modeled impulse responses, and the third set of third modeled impulse responses such that the closest matching modeled impulse response corresponds to a smallest error in a combined set of the first set or errors, the second set of errors, and the third set of errors.

12. The method of claim 11, wherein:

determining the first set of first errors between the first portion of the first dynamic impulse response and the first set of first modeled impulse responses, comprises:

obtaining a first set of resonant frequencies from the first portion of the first dynamic impulse response;

for each first modeled impulse response in the first set of first modeled impulse responses, obtain a set of resonant frequencies of the first modeled impulse response and determine a first error of the first set of first errors between the first set of resonant frequencies and the set of resonant frequencies of the first modeled impulse response;

determining the second set of second errors between the second portion of the second dynamic impulse response and the second set of second modeled impulse responses, comprises:

obtaining a second set of resonant frequencies from the second portion of the second dynamic impulse response;

for each second modeled impulse response in the second set of second modeled impulse responses, obtain a set of resonant frequencies of the second modeled impulse response and determine a second error of the second set of second errors between the second set of resonant frequencies and the set of resonant frequencies of the second modeled impulse response;

determining the third set of third errors between the third portion of the third dynamic impulse response and the third set of third modeled impulse responses, comprises:

obtaining a third set of resonant frequencies from the third portion of the third dynamic impulse response;

for each third modeled impulse response in the third set of third modeled impulse responses, obtain a set of resonant frequencies of the third modeled impulse response and determine a third error of the third set of third errors between the third set of resonant frequencies and the set of resonant frequencies of the third modeled impulse response.

13. The method of claim 1, wherein the set of modeled impulse responses for the anchor comprise a first set of first modeled impulse responses for a first type of model of the anchor and a second set of second modeled impulse responses for a second type of model for the anchor, wherein determining the closest matching modeled impulse response from the set of modeled impulse responses that is the closest match to the portion of the empirical dynamic impulse response comprises:

determining a first set of first errors between the first portion of the first dynamic impulse response and the first set of first modeled impulse responses;

determining a second set of second errors between the second portion of the second dynamic impulse response and the second set of second modeled impulse responses;

selecting the closest matching modeled impulse response from the set of modeled impulse responses comprises selecting the closest matching modeled impulse response from the first set of first modeled impulse responses and the second set of second modeled impulse responses such that the closest matching modeled impulse response corresponds to a smallest error in a combined set of the first set or errors and the second set of errors.

14. A method of determining a tension of an anchor embedded in a dam, comprising:

applying a force pulse to the dam;

measuring a dynamic impulse response of the dam in response to the force pulse, wherein a portion of the empirical dynamic impulse response is dominated by a dynamic behavior of the anchor;

determining a set of observed resonant frequencies from the portion of the empirical dynamic impulse response dominated by the dynamic behavior of the anchor;

obtaining sets of modeled resonant frequencies for the anchor, wherein the set of modeled resonant frequencies map to a set of tension values for the anchor;

determining a closest matching set of modeled resonant frequencies from the sets of modeled resonant frequencies, wherein the set of the closest matching set of modeled resonant frequencies is a closest match to the set of observed resonant frequencies; and selecting a first tension value from the set of tension values for the anchor, wherein the first tension value maps to the closest matching set of modeled resonant frequencies that is the closest match to the set of observed resonant frequencies.

15. The method of claim 14, wherein the force pulse is applied to the dam using a cold gas thruster.

16. The method of claim 15, wherein the empirical dynamic impulse response is measured with one or more sensors.

17. The method of claim 16, wherein determining the closest matching set of modeled resonant frequencies from the sets of modeled resonant frequencies comprises determining a set of errors between the set of observed resonant frequencies and each of the sets of modeled resonant frequencies.

18. A method of determining a tension of an anchor embedded in a dam, comprising:

applying a force pulse to the dam;

measuring a dynamic impulse response of the dam in response to the force pulse;

determining a set of observed resonant frequencies from the empirical dynamic impulse response that are located at frequencies greater between 250 Hertz and 2500 Hertz;

obtaining sets of modeled resonant frequencies for the anchor, wherein the set of modeled resonant frequencies map to a set of tension values for the anchor;

determining a closest matching set of modeled resonant frequencies from the sets of modeled resonant frequencies, wherein the set of the closest matching set of modeled resonant frequencies is a closest match to the set of observed resonant frequencies; and selecting a first tension value from the set of tension values for the anchor, wherein the first tension value maps to the closest matching set of modeled resonant frequencies that is the closest match to the set of observed resonant frequencies.

19. The method of claim 18, wherein the force pulse is applied to the dam using a cold gas thruster.

* * * * *